Patented Apr. 20, 1954

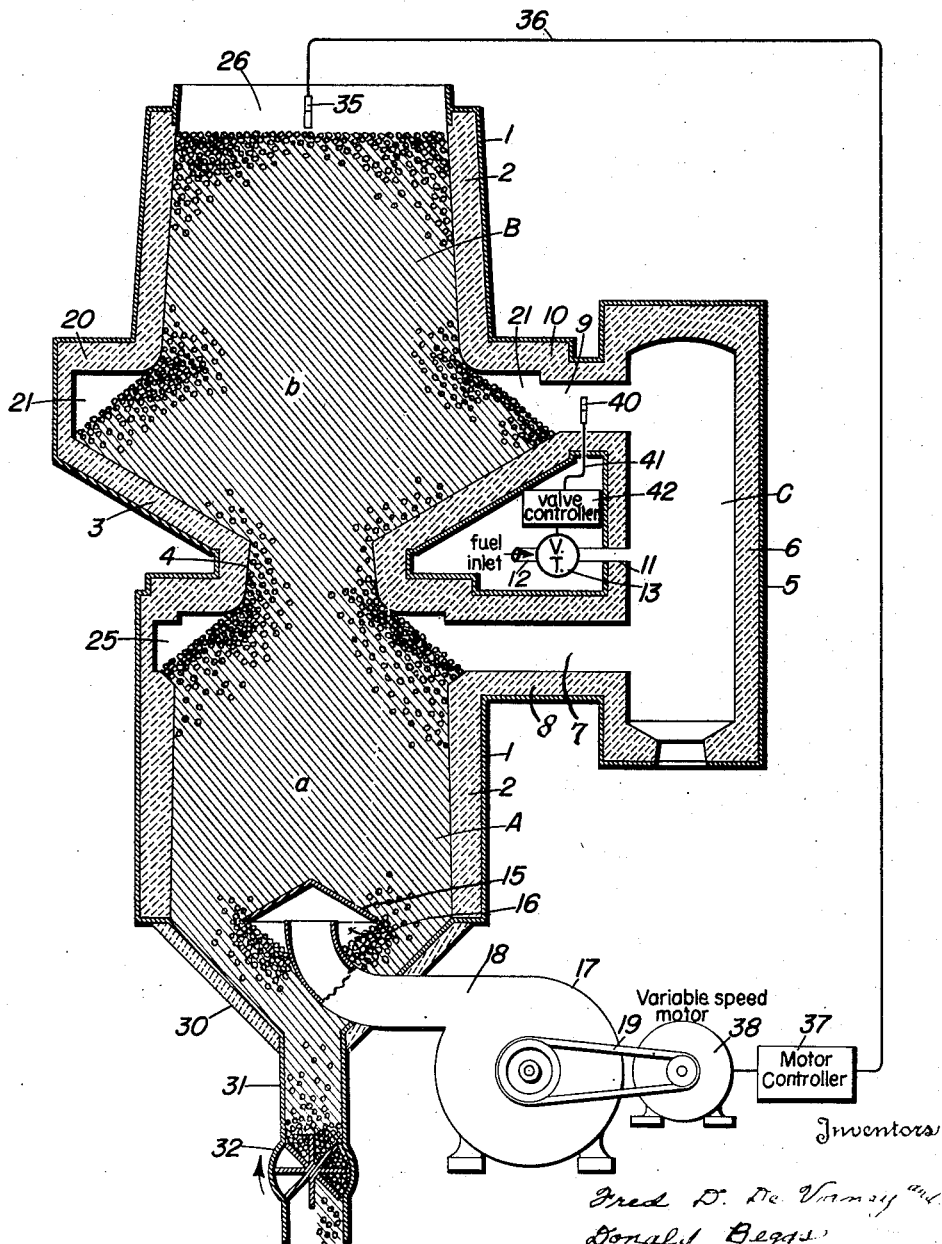

2,676,095

UNITED STATES PATENT OFFICE 2,676,095

INDURATING FURNACE AND PROCESS

Fred D. De Vaney, Hibbing, Minn., and Donald Beggs, Toledo, Ohio, assignors to Erie Mining Company, Hibbing, Minn., a corporation of Minnesota Application January 14, 1948, Serial No. 2,315

3 Claims. (Cl. 75—3)

This invention relates to the furnace and furnacing art, and is concerned with the provision of a method of controlling a heating operation in which the heating requirement varies with varying load and which may require a fixed or substantially constant ingoing temperature of a heating medium. In its preferred embodiment, the invention is concerned with the provision of a method of controlling the heat line in heat-treating or indurating balled-up pellets of finely divided mineral material such as ore fines, raw cement mixes and the like, and will be more particularly described, in the following, as a method of controlling the heat line in the operation of a pellet-indurating furnace of the type described in the immediately following paragraphs.

In the induration procedure contemplated, initially moist, "raw" pellets of balled-up finely divided mineral material are fed to the upper surface of a generally vertical dumb-bell shaped assemblage of similar pellets contained in a pair of thermally insulated chambers, disposed one above the other and communicating through a connecting conduit of restricted cross-section. As raw pellets are fed to the stockline, an equivalent volume of indurated and cooled pellets are discharged from the base of the dumb-bell shaped assemblage, thereby effecting the progressive downward movement of the pellets through the furnace. In the upper portion of the upper half of the assemblage the initially moist pellets are dried and incipiently hardened, and as they descend through the remainder of the upper chamber of the furnace their temperature is progressively raised to optimum indurating temperature by means of a current of heating gas forced upwardly through the column. The highly heated pellets descend through the restricted conduit into the lower chamber of the furnace, and during their gradual descent through the latter transfer their heat to a current of cooling gas forced upwardly through the column, with the result that the indurated pellets are discharged from the furnace at a temperature which, in the ideal case, is not materially in excess of that of the ambient air.

The cooling gas, e. g., air, which is preheated by heat exchange from the hot pellets during its passage through the column of pellets contained in the lower chamber of the furnace, is withdrawn from the top of the lower chamber and passed to a thermally insulated combustion chamber wherein the preheated air is thermally enriched, by combustion of a fluent fuel fed thereinto, to the desired indurating temperature. The resulting highly heated air-combustion products mixture thereupon is forced upwardly through the column of pellets contained in the upper chamber of the furnace, to which pellets it transfers its heat, exciting from the top of the upper chamber at a temperature not materially in excess of its dew point or of the temperature of the incoming pellets. With a minimization of radiation losses by adequate thermal insulation of the apparatus, the necessary heat expenditure is mainly that represented by the heat used in evaporating the water content of the initially moist raw pellets. This is true primarily because of the high efficiency of heat transfer between the gas (air) and the mass of pellets.

In the carrying out of such a pellet-indurating or pellet-heating process as that above described, it has been found advisable, if not absolutely necessary, that the spacial location of the heat line be carefully controlled, to the end that the raw pellets are carried through the drying stage and thereupon through a stage of incipient induration before they have so far descended in the upper chamber as to be unduly compressed by superimposed pellets. That is to say, early in the period of heating the pellets from room temperature to final induration temperature the pellets pass through a transitory critical stage, when dried but not yet incipiently indurated, in which they are extremely feeble, and therefore will support little weight; upon further heating they rapidly regain their original mechanical strength and further improve in strength with increased temperature of heating. Hence, it is important that heating past such critical stage be completed high up in the charge column in the upper chamber.

Operation of this type of "pebble stove," with its close approach to thermal reversability as between the descending mass of solid particles and the ascending current of gaseous heating medium, requires that the rise of the heatline be balanced against the rate of descent of the charge. As the rate of blowing increases—the rate of descent of the charge being constant—the height of the heatline increases. An increase in the rate of descent of the charge, the blowing rate being held constant, is attended by a decrease in the height of the heatline. It is necessary to maintain the heatline at a substantially constant level: if it were to ascend too far, spoilage of pellets (by exfoliation and/or decrepitation) and inordinate loss of heat (in the "spent gas" exiting from the top of the column in the upper chamber) would result. If it were to descend too far, moisture would condense on the "raw" pellets near the stockline (with the result that the so-affected pellets would become unduly sticky), and, as noted above, incipient induration would occur so far down in the charge column that the pellets would be deformed or "squashed" before the desired hardening could be effected. Squashed pellets are undesirable not only because their form is not wanted but also because their presence in the charge column interferes with uniform flow of the gaseous heating medium and may interfere with uniform descent of the charge.

It is to be appreciated, in the above connection, that the rate of feed of raw pellets to the stockline is subject to substantial fluctuation both as to quantity per unit of time and as to heat requirement by reason of variations in the composition of the pellets and variations in the quantity of moisture in the pellets.

It follows, then, that economical operation of the process demands a nice control of the heat line.

An object of the present invention is the provision of a method of controlling the heat line in operation of a furnace of the above described type. Another object of the invention is to provide a method of maintaining the heat line at a desired level while the heating requirement of the furnace charge varies. A further inventive object is to provide for holding the temperature of the spent gas above but as close as possible to the temperature of the incoming material or to its dew point.

It has now been found that the above and other inventive objects can be realized by controlling the rate of flow of the heating medium through the charge from the temperature of the spent gas. This result can be effected by adjusting the rate of introduction of air into the lower chamber in accordance with changes in the temperature of the spent gas. That is to say, upon a rise in the temperature of the spent gas above a predetermined "normal," the rate of blowing is decreased in order to lower the heat line. Similarly, upon a drop in the temperature of the spent gas (e. g., a dangerously close approach to its dew point) the rate of blowing is increased in order to raise the heat line.

It will of course be appreciated that in a case where the maximum temperature to which the fluent solid particles can or should be heated is critical, the temperature of the ingoing gaseous heating medium is to be suitably controlled; also that in so controlling the ingoing temperature any variation in the rate of blowing is to be compensated for by an appropriate variation in the rate of fuel introduction, whereby to match heat input with the requirement of the preheated air delivered to the combustion space, to maintain the desired substantially constant ingoing temperature of the gaseous heating medium.

The invention will now be described more fully in the following specification and in the accompanying drawing, in which the single figure is a diagrammatic view of apparatus operable for use in the carrying out of the process of the present invention.

In the drawing, A and B are a pair of similar, vertical, axially disposed chambers having a generally tubular (e. g., tubular with substantially circular cross-section) outer metallic shell 1 enclosing a relatively thick tubular refractory wall 2. Wall 2 may be and preferably is formed of refractory brick or refractory brick backed with insulating brick. Chambers A an B are separated by a dished annulus 3, of refractory material provided with an axially central opening or conduit 4 of restricted cross-sectional area.

A combustion chamber C is disposed beside chambers A and B and generally opposite annulus 3. The combustion chamber is formed, like A and B, of a metallic shell 5 with a relatively thick refractory lining 6, and its interior communicates with the top of chamber A through conduit 7—thermally insulated as at 8—and with the bottom of chamber B through conduit 9—thermally insulated as at 10. A burner nozzle 11 extends, through walls 5, 6, into the interior of chamber C. Burner nozzle 11 communicates with a source (not shown) of fluid fuel through fuel pipe 12 provided with automatic throttle valve 13 for variable control of the fuel input.

Chamber A is provided, adjacent its bottom, with an axially disposed conical baffle 15. Pellets moving by gravity through chamber A are forced by baffle 15 to move away from the axis of A and when past its lower edge roll inwardly again: an axially disposed lower free space 16, adjacent a free surface of extreme area of a column $a$ of pellets in chamber A, thereby is provided. Free space 16 communicates with the pressure side of blower 17 through conduit 18. Blower 17 is driven, through a belt 19, by a variable speed motor 38. Conduit 18 extends into chamber A, terminating in the free space 16 beneath baffle 15.

Chamber B is provided, adjacent its bottom, with an annular enlargement 20 providing therebeneath a lower free space 21 adjacent a free surface of extensive area of a column $b$ of pellets in chamber B. Lower free space 21 communicates with combustion chamber C through lagged conduit 9.

The annulus 3 separating chambers A and B is so disposed with relation to the generally vertical walls of A as to provide in A an upper free space 25 immediately adjacent to and coextensive with an upper free surface, of extensive area, of bed $a$. Space 25 communicates with combustion chamber C through lagged conduit 7.

The upper end of chamber B may be, and preferably is, closed off by a suitable hood or dome (not shown in the drawing), providing above the normal stockline of a column $b$ of pellets contained in chamber B and upper free space 26 coextensive with the top surface of said column. Suitable mechanism (not shown) for substantially continuously replenishing column $b$ with raw pellets may be, and preferably is, provided: such mechanism may, for example, be that described and claimed by Ernest G. de Coriolis and Rollie P. Campbell in their copending application entitled "Furnace Loading Mechanism," filed November 5, 1947, Serial No. 784,220, now Patent No. 2,538,556, granted January 16, 1951, or other suitable furnace loading mechanism.

Chamber A beneath baffle 15 is terminated by a conical bottom 30 communicating through chute 31 with the exterior by way of star gate 32 for the discharge of pellets from the bottom of column $a$.

A thermocouple 35 is suspended in chamber B above and adjacent to the upper surface of column $b$ and is connected by suitable lead wires 36 to motor controller mechanism diagrammatically represented at 37. Motor controller mechanism 37 functions in known manner to vary the speed of variable speed motor 38 and hence the speed of the blower 17 in accordance with changes in temperature in space 26, as measured by thermocouple 35, the control being so arranged that an increase in the temperature of the exit gas in space 26 above, say, 200° F., results in a decrease in the speed of blower 17, and vice versa. Other means of varying the amount of air blown into the furnace, such as the use of a butterfly valve in the air line, can be used.

A thermocouple 40 is positioned in the conduit 9, and is connected by suitable lead wires 41 to a valve controller mechanism 42 for controlling in known manner the setting of throttle valve 13 and hence the amount of fuel fed to burner 11. The control is so arranged that an increase in the temperature of the heating medium flowing through conduit 9 into space 21 above, say, 1800° F. (or whatever the arbitrary "standard" for induration temperature may be) results in a decrease in the fuel input through burner 11, and vice versa.

In operation, raw pellets are continuously fed to the stockline column $b$, and a corresponding volume of thermally treated and cooled pellets is continuously discharged at 32, inducing the progressive gravitational movement of columns $a$ and $b$ through the furnace. In the first several inches of their downward travel in column $b$ the pellets are dried and incipiently hardened. As they continue to descend in column $b$ they are progressively heated until at the level of space 21 they have been heated to from 1800° to 2000° F.—depending on the predetermined optimum induration temperature for the particular composition being processed. The highly heated pellets descend through restricted conduit 4 into chamber A to constitute a part of column $a$. In their gravitational movement through A the pellets are progressively cooled—by heat transfer to the countercurrent of air passing therethrough— and finally are discharged from the apparatus through star gate 32 at a temperature approaching that of the incoming air current.

Simultaneously, a current of atmospheric air is forced by blower 17 through conduit 18 into lower open space 16. The air current thence passes into column $a$ and ascends therethrough, being preheated by heat transferred to it from the pellets in column $a$, to upper annular open space 25. The preheated air passes through conduit 7 into combustion chamber C, wherein it supports the combustion of fuel fed into C through nozzle 11. Sufficient fuel is used to raise the temperature of the air from its particular preheat temperature to the optimum induration temperature (1800°–2000°F.) for the pellets, and the resulting highly heated air-combustion products mixture passes through conduit 9 into lower annular open space 21 of chamber B. From thence it enters column $b$ and ascends therethrough to upper open space 26 and from thence out of the apparatus. In its passage through the column $b$ the initially highly heated gas progressively loses heat to the pellets until it escapes the top of column $b$ at a temperature between about 150° and about 250° F. The pellets in the zone nearer the level of space 21 are heated to maximum temperature, while the pellets in the intermediate zone of column $b$ simultaneously are heated at an intermediate temperature.

Variation, from an arbitrary standard, in the spent gas temperature in space 26, as measured by thermocouple 35, indicative of an unwanted variation in the heat distribution obtaining in the upper part of column $b$, is compensated for by a suitable variation in the speed of blower 17 and hence the rate of admission of air into the bottom of the furnace, whereby to return the spent gas temperature to its "standard." Simultaneously, variation in the temperature of the heating medium passing from combustion chamber C to lower open space 21 by way of conduit 9, e. g., caused by a modification in the air blowing rate, is compensated for by a suitable variation of the fuel input through burner 11, whereby to return the ingoing temperature of the heating medium to its "standard."

It is to be understood that the apparatus specifically shown and described is illustrative only of the invention and is not limitative of the latter. Thus, in lieu of the star gate 32, any other known furnace unloader means, e. g., a vibratory chute unloader device or the like, may be employed for discharging heat-treated and cooled solids from the bottom of column $a$. In lieu of the axially disposed baffle 15 there may be employed, for the purpose of providing a lower open space adjacent a lower free surface, of extensive area, of column $a$, an annular baffle depending from the wall of chamber A to define therebeneath an annular open space to which conduit 18 communicates. Similarly, a lower open space functionally equivalent to 21 may be provided at the lower part of chamber B by the use of an annular depending baffle such as that just described. The height of chamber A and/or chamber B may be altered, in view of the character of the solid material being processed, to bring the back pressure within the limits peculiar to the blowing mechanism being employed. Passage of gas (air) through the apparatus may, if desired, be aided by use of a suction means, e. g., a suction fan, communicating with upper open space 26.

In the foregoing the invention has been described with reference to a process wherein all of the heat necessary for the desired heat-treatment is introduced into the system by way of the incoming heating gas, the latter being at maximum heat-treating temperature when introduced into the column of fluent solids. The invention also is applicable in a situation wherein some of the total heat necessary for the desired heat-treatment is introduced into the column of fluent solids by combustion of fuel in situ, the fuel being introduced into the column with the fluent solids as charged. For example, in the specific case of indurating pellets of finely divided mineral matter we may choose to add to the finely divided mineral material a small amount, e. g., 4 to 5 pounds per ton, of powdered coal (or coke breeze or other suitable non-gaseous fuel) the same being uniformly dispersed throughout the composition constituting the pellets, and being insufficient to provide all the thermal requirement of the process. In such case, after the pellets have been charged onto the stockline and have become dried as they descend somewhat below the latter, their contents of fuel burn in the heated air countercurrently being forced through the descending column of pellets and the resulting heat of combustion, being largely generated within the pellets per se, tends to bring about a thoroughgoing induration at the centers as well as at the surfaces of the pellets. By continuously measuring the temperature of the spent gas and adjusting the rate of air blowing in accordance with changes in that temperature, the spacial disposition of the zone of burning of the pellet-contained fuel and hence of the zone of incipient induration can be controlled. In this embodiment, the amount of fuel introduced into and burned in the preheated air in the combustion zone is, of course, diminished in accordance with the amount of fuel incorporated in the pellets.

In the case just described, due to the heat being generated within the pellets, the temperature of the heated air leaving the combustion chamber may well be somewhat and even substantially below the maximum temperature attained in the pellets.

As the amounts of fuel incorporated in the pellets are increased, the amounts of fuel burned in the combustion chamber become smaller and smaller to the point where all the heat necessary for carrying out the process is being generated in situ in the pellets. In such case, the combustion chamber may be omitted and the furnace structure may be simplified to a single shaft. Control of the maximum temperature attained in the column of fluent solids is, in such case, effected only indirectly, by varying the amount of powdered coal or other fuel incorporated into the composition from which the pellets are made. The spacial occurrence of the heat line, however, is directly controlled by varying the rate of blowing in accordance with changes in the temperature of the exit gas. Imposition of the control system of the present invention thereby makes possible a saving in fuel and brings about other desirable results, e. g., minimization of spalling of pellets.

We claim:

1. Process of working up moist loose finely divided oxidic iron concentrates into heat-indurated pellets, which comprises uniformly dispersing in said concentrates an amount of finely divided solid carbonaceous fuel, of the order of a few pounds per long ton dry weight of said concentrates, insufficient by its eventual combustion to provide all the thermal requirements of the process, balling up the solid fuel-containing concentrates into pellets, establishing and maintaining a gravitationally descending column of the initially substantially unheated pellets, thermally enriching a current of air by introducing and burning fuel therein to provide a combustion-supporting heating medium at a combustion-initiating temperature below the eventual maximum induration temperature, adjusting the heat content of the air current with respect to the calorific value of the fuel content of the pellets so that the sum thereof at least equals the thermal requirement of the process, countercurrently passing the heating medium through said column, measuring changes in the level of the heat line at which incipient hardening of the pellets occurs in said column in terms of a corresponding change effected in the temperature of said heating medium at the upper exit end of said column, and varying the rate of passage of said heating medium through said column inversely as the variation in the temperature of the spent heating medium exiting from the top of said column, thereby to maintain said heat line at a constant and predetermined level, while simultaneously maintaining substantially constant the inlet temperature of the heating medium.

2. Apparatus for heat-treating initially moist balled up pellets of finely divided mineral matter comprising top and bottom furnace chambers disposed in superposed relation and communicating with each other, said chambers being adapted to be filled with a column of said pellets, means for discharging treated pellets from the lower end of said bottom chamber, thereby to effect a progresisve downward movement of the pellets through said furnace chambers, means for supplying untreated pellets to the upper end of said top chamber simultaneously with the discharge of pellets from said bottom chamber to maintain the pellet column in said chambers, a combustion chamber disposed laterally of said furnace chambers, an air inlet conduit leading to said combustion chamber from the upper portion of said bottom furnace chamber, an air and combustion gas outlet conduit leading from said combustion gas chamber to said top furnace chamber, a fuel supply to said combustion chamber, means regulating the supply rate of said fuel in accordance with the temperature of the combustion gases and air ingoing to said top furnace chamber whereby to maintain a substantially constant ingoing temperature, a blower unit for blowing air upwardly through the descending pellet column in said bottom chamber and said air conduit into said combustion chamber and for blowing combustion gas and air through said outlet conduit and upwardly through the descending pellet column in said top chamber whereby to establish in the column in the upper part of the upper chamber at a distance beneath the stockline of the column a heat line at which incipient induration of the pellets is effected, a temperature-responsive device responsive to the temperature of the gases exiting from the stockline of the column, and means actuated by said temperature-responsive device for varying the rate at which air is blown from said blower unit inversely as the change in exit temperature of said gases thereby to maintain the heat line at a substantially constant predetermined distance beneath the stockline.

3. In the process of indurating initially moist and balled-up pellets consisting essentially of finely divided mineral matter involving the steps of maintaining a gravitationally descending column of such pellets by withdrawing indurated pellets from the bottom and adding initially moist and substantially unheated pellets at the top of such column to maintain the height of the latter, thermally enriching a current of air by introducing and burning fuel therein to provide a current of gaseous heating medium at an elevated temperature, and countercurrently passing the current of gaseous heating medium through said column and thereby effecting in said column a temperature distribution pattern including a zone of incipiently indurated pellets in the upper part of said column above a zone of indurated pellets and beneath a zone of pellets in the course of becoming dried, the method of maintaining said zone of incipient induration at a substantially constant and predetermined level in the upper part of said column which consists in varying the rate of passage of said gaseous heating medium into and through said column inversely in accordance with variation in the temperature of the spent medium exiting from the column while simultaneously maintaining substantially constant the temperature of the gaseous heating medium.

References Cited in the file of this patent

UNITED STATES PATENTS

| Number | Name | Date |
|---|---|---|
| 1,210,166 | Hess | Dec. 26, 1916 |
| 2,068,574 | Smith | Jan. 19, 1937 |
| 2,341,101 | Howard | Feb. 8, 1944 |
| 2,363,281 | Arnold | Nov. 21, 1944 |
| 2,447,306 | Bailey et al | Aug. 17, 1948 |
| 2,533,142 | Royster | Dec. 5, 1950 |

OTHER REFERENCES

Link-Belt (Roto Louver Dryer) Book No. 1911, Office copy received July 22, 1941.

Proceedings of the Blast Furnace and Raw Materials Committee, vol. 4, 1944, pages 54–57.